US009268575B2

(12) United States Patent
Fleischman et al.

(10) Patent No.: US 9,268,575 B2
(45) Date of Patent: Feb. 23, 2016

(54) FLUSH OPERATIONS IN A PROCESSOR

(75) Inventors: Jay E. Fleischman, Fort Collins, CO (US); Emil Talpes, Sunnyvale, CA (US); Debjit DasSarma, San Jose, CA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 1175 days.

(21) Appl. No.: 13/174,293

(22) Filed: Jun. 30, 2011

(65) Prior Publication Data
US 2013/0007418 A1 Jan. 3, 2013

(51) Int. Cl.
*G06F 9/38* (2006.01)
(52) U.S. Cl.
CPC .................... *G06F 9/3865* (2013.01)
(58) Field of Classification Search
CPC ............... G06F 9/3851; G06F 9/3865
See application file for complete search history.

(56) References Cited

U.S. PATENT DOCUMENTS

| 5,305,455 A | 4/1994 | Anschuetz et al. |
| 5,481,719 A | 1/1996 | Ackerman et al. |
| 5,515,538 A | 5/1996 | Kleiman |
| 5,715,458 A | 2/1998 | Holder et al. |
| 6,112,019 A * | 8/2000 | Chamdani et al. ............ 712/214 |
| 6,282,601 B1 | 8/2001 | Goodman et al. |
| 6,651,163 B1 | 11/2003 | Kranich et al. |
| 7,373,489 B1 * | 5/2008 | Brooks et al. ................. 712/244 |
| 2004/0215938 A1 * | 10/2004 | Burky et al. .................. 712/218 |

* cited by examiner

*Primary Examiner* — John Lindlof
(74) *Attorney, Agent, or Firm* — Park, Vaughan, Fleming & Dowler LLP

(57) ABSTRACT

Methods and apparatuses are provided for flush operations in a processor. The apparatus comprises an out-of-order execution unit for processing instructions issued in-order from an instruction decoder for first and second threads and being configured to identify an errored instruction in a first thread. A retire unit includes a retire queue for receiving completed instructions from the out-of-order execution unit, the retire unit being configured retire older in-order first thread instructions until the errored instruction would be the next instruction to be retired, and then flushing the errored instruction and all later in-order first thread instructions from the retire queue. The method comprises determining that an errored instruction is being processed by an out-of-order execution unit of a processor and continuing to process to completion instructions earlier in-order from the errored instruction until the completion of the errored instruction. Following completion of the errored instruction, it is flushed along with all instructions later in-order than the errored instruction to recover the processor to a pre-error state.

18 Claims, 5 Drawing Sheets

FLUSH OPERATIONS IN A PROCESSOR

TECHNICAL FIELD

The technical field relates to information or data processors. More specifically, this disclosure relates to the field of processor exception and interruption handling by flushing instructions and recovering the processor to a known operational state.

BACKGROUND

Superscalar processors achieve higher performance by executing multiple instructions concurrently and out-of-order. That is, instructions can be (and often are) processed out of the order that the instructions were programmed (or dispatched). Another important performance parameter for a processor is the manner in which it handles exceptions and interruptions. A conventional technique is referred to as "check pointing", and involves the continual saving (storing) of processing states during the processing of instructions so that the processor may recover to a previous known good state following an exception or interruption. However, the memory overhead necessary for check pointing and the continual saving and restoring operations can significantly impact the overall performance of a processor.

BRIEF SUMMARY OF THE EMBODIMENTS

An apparatus is provided for flush operations in a processor. The apparatus comprises an out-of-order execution unit for processing instructions dispatched in-order from an instruction decoder for first and second threads and being configured to identify an errored instruction in a first thread. A retire unit includes a retire queue for receiving completed instructions from the out-of-order execution unit, the retire unit being configured to retire older in-order first thread instructions until the errored instruction would be the next instruction to be retired, and then flushing the errored instruction and all later in-order first thread instructions from the retire queue.

A method is provided for flush operations in a processor. The method comprises determining that an errored instruction is being processed by an out-of-order execution unit of a processor and continuing to process to completion instructions earlier in-order from the errored instruction until the completion of the errored instruction. Following completion of the errored instruction, it is flushed along with all instructions later in-order than the errored instruction to recover the processor to a pre-error state.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, the following detailed description or for any particular processor microarchitecture.

Figure 1:
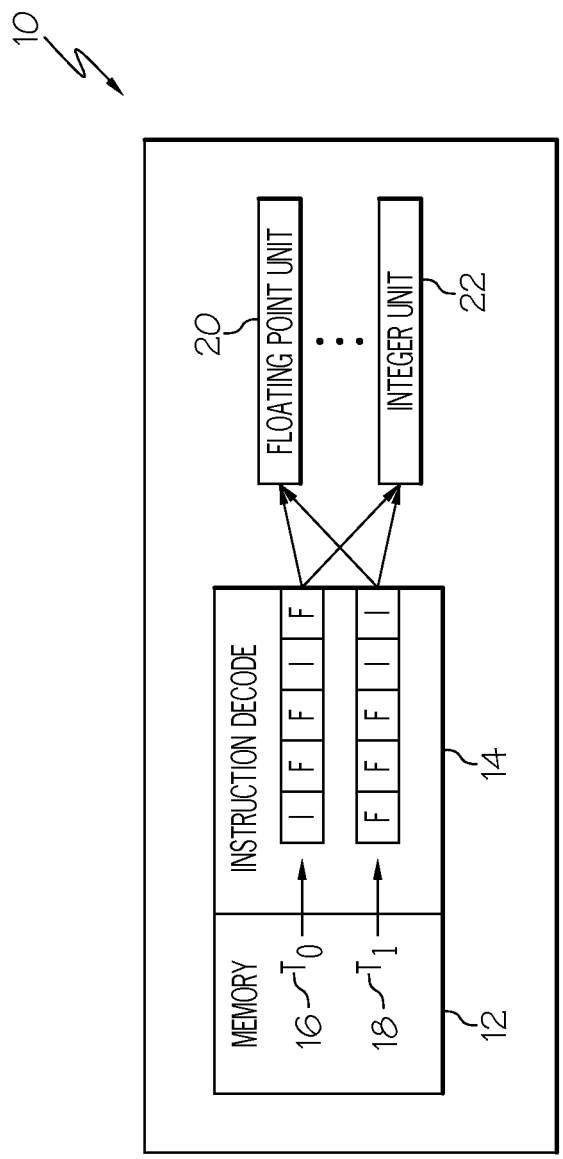
FIG. 1 is a simplified exemplary block diagram of processor suitable for use with the embodiments of the present disclosure.

Referring now to FIG. 1, a simplified exemplary block diagram is shown illustrating a processor 10 suitable for use with the embodiments of the present disclosure. In some embodiments, the processor 10 would be realized as a single core in a large-scale integrated circuit (LSIC). In other embodiments, the processor 10 could be one of a dual or multiple core LSIC to provide additional functionality in a single LSIC package. As illustrated, processor 10 is a multi-threaded processor (threads $T_0$ and $T_1$ shown) that includes a memory 12. The memory 12 can be any type of suitable memory. This includes the various types of dynamic random access memory (DRAM) such as SDRAM, the various types of static RAM (SRAM), and the various types of non-volatile memory (PROM, EPROM, and flash). In certain embodiments, additional memory (not shown) may be available "off chip" of the processor 10.

The processor 10 also includes an instruction decoder 14 that fetches and decodes instructions for each thread from the memory 12. Accordingly, as shown in FIG. 1, the instruction decoder 14 retrieves and decodes instructions for thread zero (T0) 16 and thread one (T1) 18. For ease of understanding, only two threads are illustrated, however, it will be appreciated that more threads may be concurrently processed by the processor 10. Also, only floating-point and integer instructions are illustrated, however, other instructions may be processed as will be appreciated. In the instruction decoder 14, all instructions are fetched in-order (meaning in program order) and dispatched in-order to the operating units. As expected, floating-point instructions (F) from the instruction decoder 14 are routed to a floating-point unit 20 while integer instructions (I) are routed to an integer unit 22. Within a processor, numerical data is typically expressed using integer or floating-point representation. Mathematical computations within a processor are generally performed in computational units designed for maximum efficiency for each computation. Thus, it is common for processor architecture to have an integer computational unit 22 and a floating-point computational unit 20. Multiple floating-point units and/or integer units may be included in the processor 10 as well as various other types of units as desired for any particular processor microarchitecture.

Figure 2:
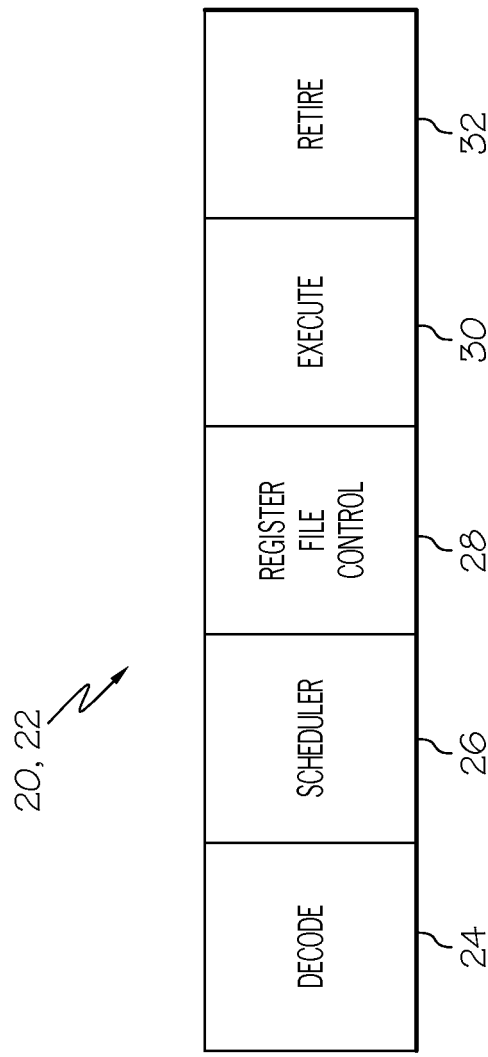
FIG. 2 is a simplified exemplary block diagram of an operational (e.g., floating-point or integer) unit suitable for use with the processor of FIG. 1.

Referring now to FIG. 2, a simplified exemplary block diagram of an operational unit suitable for use with the processor 10 is shown. In one embodiment, FIG. 2 could operate as the floating-point unit 20, while in other embodiments FIG. 2 could illustrate the integer unit 22.

In operation, the decode unit 24 decodes the incoming instructions or operation-codes (opcodes) fetched and dispatched by the instruction decoder 14. The decode unit 24 is responsible for the general decoding of instructions (e.g., x86 instructions and extensions thereof) and providing decoded instructions in-order to be scheduled for processing and execution.

The scheduler 26 contains a scheduler queue and associated issue logic. As its name implies, the scheduler 26 is responsible for determining which opcodes are passed to execution units and in what order. That is, the scheduler 26 determines whether and how to process instruction; either in-order or out-of-order for the most efficient operation. In one embodiment, the scheduler 28 accepts opcodes from decode unit 24 and stores them in the scheduler 26 until they are eligible to be selected by the scheduler to issue in-order or out-of-order to one of the execution pipes as is discussed in more detail in conjunction with FIG. 3).

The register file control 28 holds the physical registers. The physical register numbers and their associated valid bits arrive from the scheduler 26. Source operands are read out of the physical registers and results written back into the physical registers. In a multi-pipelined (super-scalar) architecture, an opcode (with any data) would be issued for each execution pipe.

The execute unit(s) 30 may be embodied as any general purpose or specialized execution architecture as desired for a particular processor. In one embodiment the execution unit may be realized as a single instruction multiple data (SIMD) arithmetic logic unit (ALU). In other embodiments, dual or multiple SIMD ALUs could be employed for super-scalar and/or multi-threaded embodiments, which operate to produce results and any exception bits generated during execution. In the execution pipelines, instructions (opcodes) are processed out-of-order for the most efficient operation. After opcodes have completed they are forwarded to the retire unit 32.

In one embodiment, after an opcode has been completed (i.e., the completion status is known), the instruction can be processed by the retire unit 32 so that the resources (e.g., physical registers) used by that instruction can be returned to the free list and made available for use by other instructions. Instructions are retired in-order by the retire unit 32 so that the in-order arrangement of the instructions are restored to program order after being processed out-of-order by the scheduler 26 and the execution unit(s) 30. As is known, completion status of an opcode can be good or bad. The retire unit 32 cannot retire an opcode with a bad completion status (e.g., a branch mis-prediction occurred or a divide by zero operation was attempted). Instead, the retire unit 32 must handle the exception by flushing the errored instruction and all younger opcodes, and returning the processor or unit to a non-speculative state prior to whatever caused the bad completion status. The retire unit 32 performs these operation by maintaining a list of all opcodes in process in the execution unit(s) 30, the scheduler 26, and a queue of completed opcodes. The retire unit 32 is responsible for committing all the floating-point unit 16 or integer unit 18 architectural states upon retirement of an opcode.

Figure 3:
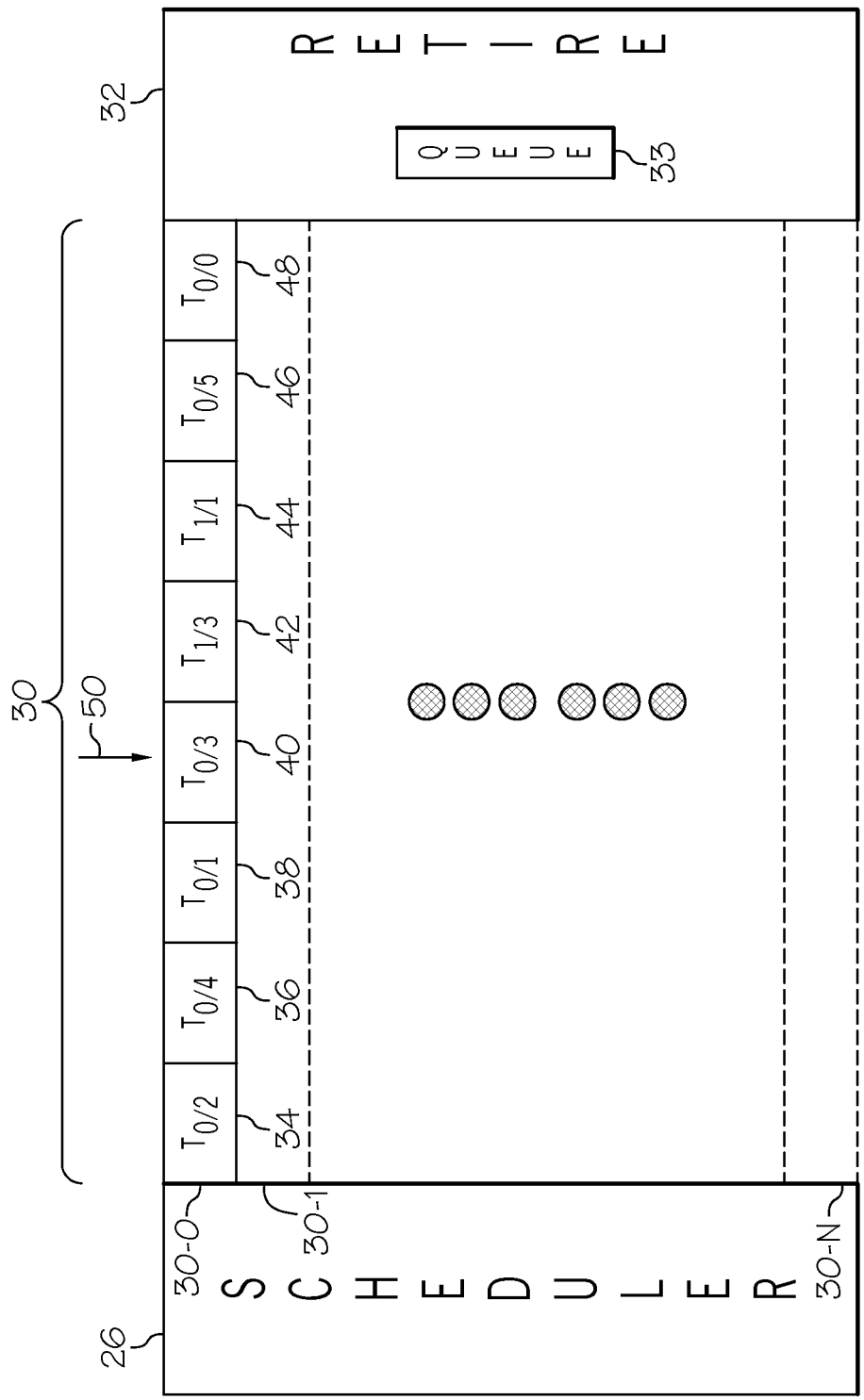
FIG. 3 is a simplified exemplary block diagram illustrating the operation of an execution unit suitable for use with the operational unit of FIG. 2.

Referring now to FIG. 3, an expanded illustration of an execution unit 30 is shown along with the scheduler 26 and retire unit 32 having a retire queue 33. In some embodiments, a multi-pipelined architecture is utilized, meaning that multiple execution pipelines (30-0 through 30-N) operate in parallel an independently of each other. For simplicity of explanation, consider execution pipeline 30-0. In the illustrated example, eight instructions 34-48 are in progress in the execution pipeline 30-0. Each instruction was picked for execution by the scheduler unit 26 and placed or inserted into the execution pipeline. After processing to completion, each instruction will be forwarded to the retire unit 32 for placement in the retire queue 33 to be retired in-order.

Instruction 48 is the oldest (in time) instruction in the execution pipeline, while instruction 34 is the youngest (most recently placed into the execution pipeline) instruction by time. Note, however, that the instructions 34-48 may be out of program order and service multiple, different threads. For example, instruction 36 ($T_{0/4}$: meaning the forth in-order instruction of thread zero) is older in time, but younger in program order than instruction 34 ($T_{0/2}$), which is the second in-order instruction of thread zero. The instructions 34-48 will be processed by the execution unit 30 out of program order as needed for efficient operation as specified by the scheduler unit 26, but must be returned to program order for in-order retirement by the retire unit 32. That is, an earlier (in time) instruction may complete (that is have a known good completion status) while later in time instructions are still being processed. The retire unit 32 must kept track of the in process (commonly referred to as "in flight") instructions and retire them in-order to align with the program order in which they were released. This increases efficiency by having completed instructions in queue in the retire unit 32 waiting for retirement, which in turn releases resources earlier than having all instructions wait its turn for normal retirement.

A complication arises with out-of-order processing when one of the in progress instructions is determined to have been executed in error. The error could arise due to a branch mis-prediction or an invalid operation such as dividing by zero. When an exception occurs, the errored instruction and all instructions younger in-order (regardless of time order) must be removed (or flushed) so that the architected state of the processing unit 10 can be returned to a pre-error condition and the errored instruction (and those that follow in-order) can be correctly re-processed or in the event of a branch misprediction, the new execution path followed. In the example illustrated in FIG. 3, consider that instruction 40 ($_{T0/3}$) is determined to be errored. Upon detecting the error, a flush pointer 50 is set to identify instruction 40 so that it can be tracked to completion in the retire queue 33, and then flushed with all younger (in program order) instructions (in this example, instructions 36 ($_{T0/4}$), 46 ($_{T0/5}$) and any younger (in-order) instructions released by the scheduler 26 into the execution pipeline 30-0 during the processing of instructions 36-48). Since the flush operation of the present disclosure flushes (removes) the errored instruction and all younger (in-order) instructions, the later in time detection of an error in an older (in-order) instruction (commonly referred to as an out-of-order flush) may be addressed simply by relocating the flush point to the older instruction. For example, if later (in time) instruction 34 (which is older in-order) is determined to be errored the flush pointer 50 could simply be moved to align with instruction 34 because when it is ultimately flushed (removed), the errored instruction 40 will also be flushed since it is younger (in-order) than instruction 34.

Once an errored instruction is detected, the instruction decoder (14 of FIG. 1) suspends issuing further instructions for the thread having the error that are destined for the same unit. In this example, all floating point instructions for thread zero (16 of FIG. 1) would cease since the error is in the floating-point unit 20 and the next (rightmost) instruction in thread zero is a floating-point (F) instruction. However, all thread one (18 in FIG. 1) instructions continue to issue since each thread is processed independently of every other thread. Conversely, if the error had occurred in thread one (18 in FIG. 1), the two rightmost instructions would be issued since they are integer (I) instructions before the next floating-point instruction as shown in FIG. 1). Upon clearing (flushing) the errored instruction and all instructions younger (in-order) than the errored instructions, the instruction decoder resumes issuing instructions for the thread formerly containing the error (thread zero in this example).

Figure 4:
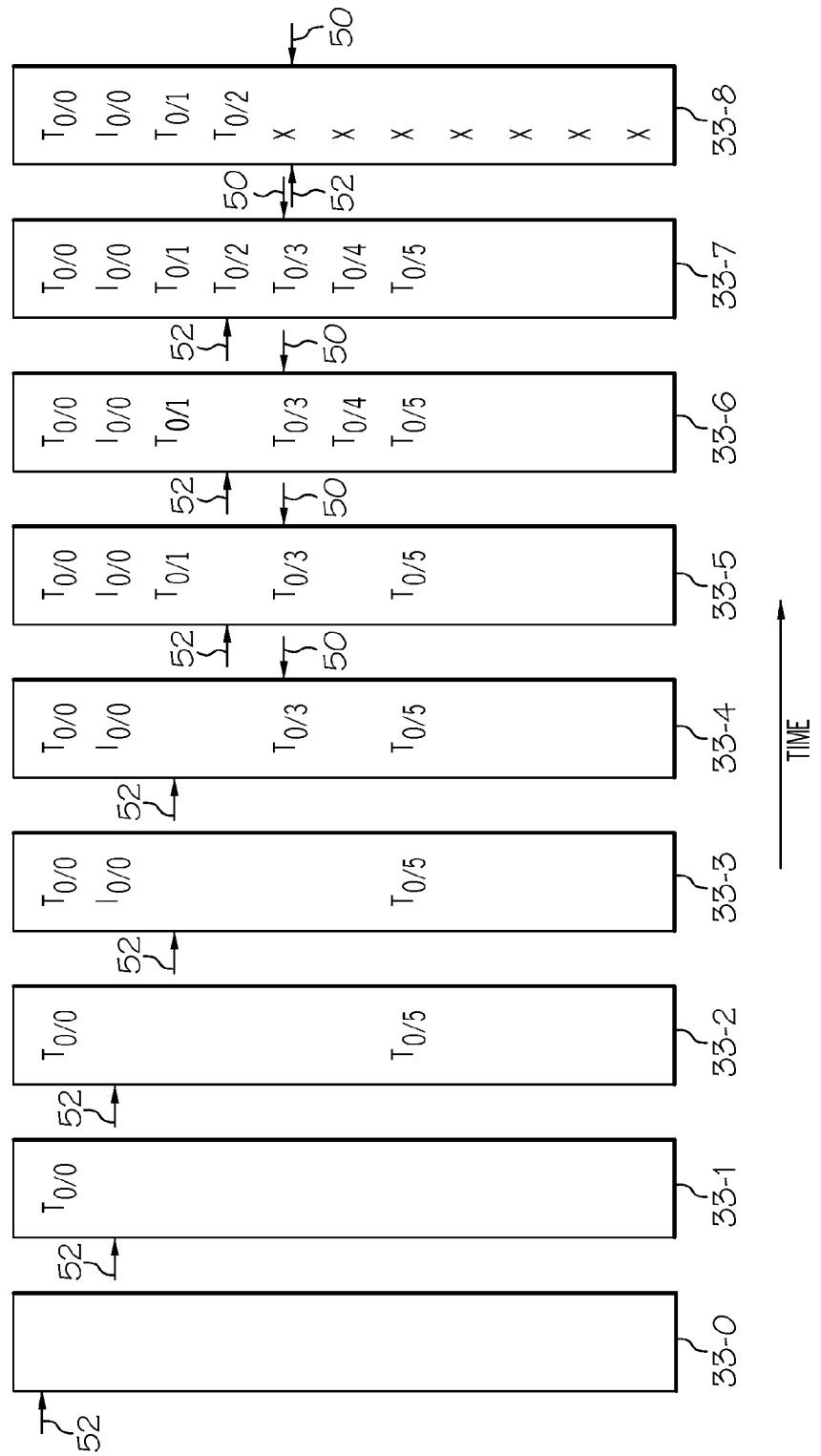
FIG. 4 is a simplified exemplary block diagram illustrating the operation of the retire queue of FIG. 3.

Referring now to FIG. 4, a simplified exemplary block diagram illustrating the operation of the retire queue 33 is shown. For ease of understanding, consider the retire queue 33 to be empty as shown at 33-0 (i.e., time zero—note the time reference arrow). The retire queue 33 includes a retire pointer 52, which indicates the point where instructions completed prior to (above the) retire pointer 52 may be retired by the retire unit 32. As shown in FIG. 4, the retire pointer 52 is at the top of the retire queue 33-0. Next, instruction 48 (FIG. 3) completes and ($T_{0/0}$) moves into the retire queue 33-0. Also, the retire pointer moves below instruction ($T_{0/0}$) since it is the oldest (in-order) instruction of thread zero and may be retired. Continuing left-to-right in FIG. 4, instruction $T_{0/5}$ (46 of FIG. 3) completes and moves into the retire queue 33-2, but below the retire pointer 52, since instruction $T_{0/5}$ cannot retire until all older (in-order) instructions complete for in-order retirement. In some embodiments a separate retire queue is maintained for each thread of the integer and floating-point instructions, while in other embodiments, the retire queues are merged by type (floating-point or integer) or by threads or both. Accordingly, consider next that an integer instruction ($I_{0/0}$) completes (from integer unit 22 of FIG. 2) and is placed in the retire queue 33-3. Since instruction $I_{0/0}$ represents the oldest (in-order) integer instruction of thread zero, the retire pointer 52 moves below instruction $I_{0/0}$ as it may retire (note that in this example that thread one has a separate retire queue and that thread one instructions continue with processing independently of the flush operation occurring for thread zero).

The next thread zero instruction to complete is instruction $T_{0/3}$ (40 of FIG. 3), which is the errored instruction. Accordingly, instruction $T_{0/3}$ appears in retire queue 33-4 (note flush pointer 50) below the retire pointer 52 and above instruction $T_{0/5}$ as the competed instructions are returned to program order for retirement. Next, instruction $T_{0/1}$ (38 in FIG. 3) completes and is placed in the retire queue 33-5, moving the retire pointer 52 below it as this instruction may retire since there are no younger (in-order) instructions that have not completed. Continuing, instruction $T_{0/4}$ (36 of FIG. 3) completes and takes its place in retire queue 33-6 between instructions $T_{0/3}$ and $T_{0/5}$ to maintain program order in the retire queue 33. In another embodiment, $T_{0/4}$ could be ignored (not processed) to further save power. Finally, instruction $T_{0/2}$ (34 of FIG. 3) completes and is placed into the retire queue 33-7 with the retire pointer 52 indicating that it may retire. Upon retirement, the retire pointer 52 aligns in retire queue 33-8 with the flush pointer 50 at instruction $T_{0/3}$ causing that instruction and all younger (in-order) instructions ($T_{0/4}$ and $T_{0/5}$ in this example) to be flushed.

Upon completion of the flush operation, any resources (e.g., registers) used by the errored and younger in-order instructions can be released to the free list and the processing unit 10 returned to its pre-error state. After that, the instruction decoder (14 of FIG. 1) may resume issuing instructions for the errored thread and the errored instruction can either be re-processed in the floating-point unit (20 of FIG. 1) or the new instruction stream processed along the correct new path for the branch mis-prediction example. This process allows for the rapid recovery of an execution pipeline without the use of check pointing which can consume significant memory resources to store the state of each pipeline at various stages of processing.

Figure 5:
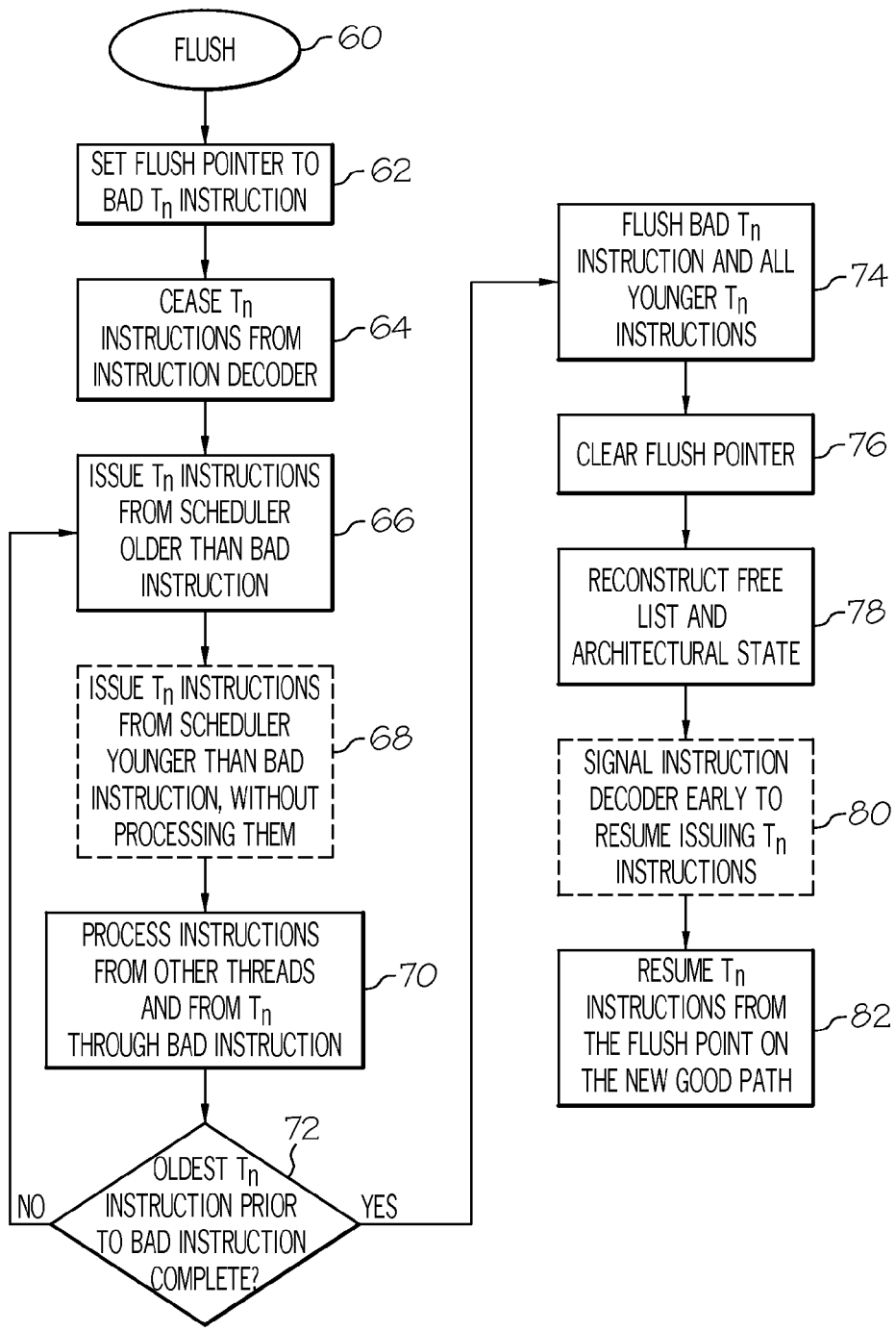
FIG. 5 is an exemplary flow diagram illustrating a method according to an embodiment of the present disclosure.

Referring now to FIG. 5, an illustration of an exemplary flow diagram illustrating the method 60 of an embodiment for flushing errored instructions is shown. The various tasks performed in connection with the process 60 of FIG. 5 may be performed by software, hardware, firmware, or any combination thereof. For illustrative purposes, the following description of the process of FIG. 5 may refer to elements mentioned above in connection with FIGS. 1-4. In practice, portions of the process 60 of FIG. 5 may be performed by different elements of the described system. It should also be appreciated that the process of FIG. 5 may include any number of additional or alternative tasks and that the process 60 of FIG. 5 may be incorporated into a more comprehensive procedure or process having additional functionality not described in detail herein. Moreover, one or more of the tasks shown in FIG. 5 could be omitted from an embodiment of the process of FIG. 5 as long as the intended overall functionality remains intact.

Beginning in step 62, the routine begins with the detection of an error and setting the flush pointer to identify the errored instruction of thread N ($T_n$). Next, in step 64, further instructions of $T_n$ destined for that unit (e.g., floating-point unit or integer unit) are suspended (ceased) from the instruction decoder (14 of FIG. 1). In the operational unit (e.g., floating-point unit or integer unit) instructions older (in-order) not yet issued into the execution pipeline are issued by the scheduler (26 of FIG. 3) in step 66 since all older (in-order) instruction must complete so that the retire unit 32 can retire the instructions in-order. Note that other instructions may also issue, including instructions for other threads since each thread processes instructions independently of the thread undergoing the flush operation. However, if instructions younger (in-order) are issued, they are known at this stage that they will be flushed. Accordingly, optionally in step 68, those instructions are issued, but not processed, in the execution unit 30 to conserve power. Step 70 continues to process instructions from other threads (since each thread is independent) and from the thread with the errored (or bad) instruction ($T_n$) until the errored instruction and all older (in-order) instructions from the same thread are compete. Decision 72 determines whether the oldest (in-order) instruction prior to the bad instruction is complete (as a reminder, that would be instruction $T_{0/2}$ of the example illustrated in FIG. 4). If not, the routine loops back to step 66 until an affirmative determination is made by decision 72.

Upon a affirmative determination of decision 72, the routine proceeds to step 74, which flushes (removes) the errored (or bad) $T_n$ instruction and all younger (in-order) instructions as was discussed in conjunction with FIG. 4. Step 76 clears the flush pointer (50 of FIG. 4) and step 78 reconstructs the free list (in retire unit 32 of FIG. 4) and pre-error architectural state of the execution pipeline so that the resources used by the errored (and younger) instructions can be reused by other instructions or by the re-processing of the errored instruction. Since the actual flushing of the instructions from the retire queue (33 of FIG. 4) and restoration of the free list and architectural state of the execution pipeline will take a certain number of processor cycles, the instruction decoder (14 of FIG. 1) can optionally in step 80 be signaled early to resume issuing $T_n$ instructions. That is, in any processor microarchitecture, it will take a certain number of cycles for the resume signal to reach the instruction decoder depending upon physical placement and buffering for a resume signal to travel from the retire unit 32 to the instruction decoder 14. Taking this into account, the retire unit can issue the signal to resume issuing instructions for $T_n$ early so that new $T_n$ instructions are being released by the time the architectural state of the execution pipeline has been restored. This maximizes efficiency. In any event, in step 82, instructions resume from the instruction decoder (14 of FIG. 1) and either the errored (and younger) instructions are re-processed or a new sequence of instructions are processed along the now known (new) good path recovering from the branch mis-prediction (for example) that originally caused the exception.

Various processor-based devices that may advantageously use the processor (or any computational unit) of the present disclosure include, but are not limited to, laptop computers, digital books or readers, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or any computational) unit of the present disclosure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method, comprising:
    determining that an errored instruction is being processed by an out-of-order execution unit of a processor;
    based on the determining, ceasing to issue instructions from an instruction decoder for a thread having the errored instruction;
    until processing to completion issued instructions for the thread earlier in-order than the errored instruction,
        continuing to process to completion issued instructions for the thread later in-order than the errored instruction, and placing, in a retire queue in a retire unit in the processor, processed instructions for the thread later in-order than the errored instruction;
    processing to completion the errored instruction and placing, in the retire queue, the errored instruction;
        processing to completion issued instructions for the thread earlier in-order than the errored instruction; and
    responsive to processing to completion the issued instructions for the thread earlier in-order than the errored instruction, flushing, from the retire queue the errored instruction and the instructions for the thread later in-order than the errored instruction to recover the processor to a pre-error state.

2. The method of claim 1, further comprising freeing resources and restoring a free list of available physical registers after flushing the errored instruction and the issued instructions for the thread later in-order than the errored instruction.

3. The method of claim 1, wherein determining further comprises setting a flush pointer for the errored instruction.

4. The method of claim 3, further comprising continuing to process instructions from other threads of the multi-threaded processor.

5. The method of claim 3, further comprising resetting the flush pointer to a given instruction for the thread later in-order than the errored instruction when the given instruction is also determined to be errored.

6. The method of claim 1, further comprising reissuing the errored instruction on a correct good path in the processor for processing.

7. A method, comprising:
    identifying an errored instruction for a first thread being processed by an out-of-order execution unit of a multi-threaded processor;
    based on the identifying, ceasing to issue instructions for the first thread from an instruction decoder;
    continuing to issue and process instructions from a second thread in the multi-threaded processor;
    until processing to completion issued instructions for the first thread earlier in-order than the errored instruction for the first thread,
        continuing to process to completion issued instructions for the first thread later in-order than the errored instruction for the first thread, and placing, in a retire queue in a retire unit in the processor, processed instructions for the first thread later in-order than the errored instruction for the first thread;
    processing to completion the errored instruction for the first thread and placing, in the retire queue, the errored instruction for the first thread;
        processing to completion issued instructions for the first thread earlier in-order than the errored instruction for the first thread; and
    responsive to processing to completion the issued instructions for the first thread earlier in-order than the errored instruction for the first thread, flushing, from the retire queue, the errored instruction for the first thread and the instructions for the first thread later in-order than the errored instruction for the first thread to recover the processor to a pre-error state.

8. The method of claim 7, further comprising freeing corresponding resources and restoring a free list of available physical registers after flushing, from the retire queue, the first thread errored instruction and instructions for the first thread later in-order than the errored instruction for the first thread.

9. The method of claim 7, further comprising identifying a given instruction for the first thread later in-order than the errored instruction for the first thread as errored when the given instruction for the first thread later in-order than the errored instruction for the first thread is also determined to be errored.

10. The method of claim 7, further comprising reissuing the errored instruction for the first thread on a correct good path in the multi-threaded processor for processing.

11. A method, comprising:
    issuing instructions in-order for a first thread and a second thread from an instruction decoder for a multi-threaded processor;

processing instructions for the first and second threads in an out-of-order execution unit of the multi-threaded processor;

determining an errored instruction for the first thread is being processed by the out-of-order execution unit of the multi-threaded processor;

ceasing to issue instructions for the first thread while continuing to issue instruction for the second thread from the instruction decoder of the multi-threaded processor;

continuing to process instructions from the second thread in the out-of-order execution unit of the multi-threaded processor;

until processing to completion issued instructions for the first thread earlier in-order than the errored instruction for the first thread, continuing to process to completion issued instructions for the first thread later in-order than the errored instruction for the first thread, and placing, in a retire queue in a retire unit in the processor, processed instructions for the first thread later in-order than the errored instruction for the first thread;

processing to completion the errored instruction for the first thread and placing, in the retire queue, the errored instruction for the first thread;

processing to completion issued instructions for the first thread earlier in-order than the errored instruction for the first thread; and responsive to processing to completion the issued instructions for the first thread earlier in-order than the errored instruction for the first thread, flushing, from the retire queue, the errored instruction for the first thread and the instructions for the first thread later in-order than the errored instruction for the first thread to recover the processor to a pre-error state.

12. The method of claim 11, further comprising resuming issuing instructions for the first thread from the instruction decoder after the multi-threaded processor has been returned to the pre-error state.

13. The method of claim 11, further comprising reissuing the errored instruction for the first thread on a correct good path in the multi-threaded processor for processing.

14. A processor, comprising:
an instruction decoder;
an out-of-order execution unit for processing instructions dispatched in-order from the instruction decoder for a first thread and a second thread; and
a retire unit having a retire queue for receiving processed instructions from the out-of-order execution unit;
the processor:

identifying an errored instruction for a first thread being processed by the out-of-order execution unit;

based on the identifying, causing the instruction decoder to cease issuing instructions for the first thread, but permitting the instruction decoder to continue to issue instructions for the second thread to be processed by the out-of-order execution unit;

until processing to completion issued instructions for the first thread earlier in-order than the errored instruction for the first thread, continuing to process to completion issued instructions for the first thread later in-order than the errored instruction for the first thread, and placing, in the retire queue, processed instructions for the first thread later in-order than the errored instruction for the first thread;

processing to completion the errored instruction for the first thread and placing, in the retire queue, the errored instruction for the first thread;

processing to completion issued instructions for the first thread earlier in-order than the errored instruction for the first thread; and responsive to processing to completion the issued instructions for the first thread earlier in-order than the errored instruction for the first thread, flushing, from the retire queue, the errored instruction for the first thread and the instructions for the first thread later in-order than the errored instruction for the first thread to recover the processor to a pre-error state.

15. The processor of claim 14, wherein the out-of-order execution unit continues to process instructions for the second thread after a flush pointer is set to the errored instruction for the first thread.

16. The processor of claim 14, wherein the out-of-order execution unit sets a flush pointer to the errored instruction for the first thread.

17. The processor of claim 14, wherein the retire unit releases resources used by the errored instruction for the first thread and the instructions for the first thread later in-order than the errored instruction for the first thread to recover the processor to a pre-error state.

18. A device comprising the processor of claim 14, the device comprising at least one of a group consisting of: a computer; a digital book; a printer; a scanner; a television; or a set-top box.

* * * * *